US000002025H

(19) United States

(12) Statutory Invention Registration (10) Reg. No.: US H2025 H

Munsinger (43) Published: Jun. 4, 2002

(54) SERIAL OUTPUT WARHEAD

(75) Inventor: Terrence Lane Munsinger, Ridgecrest, CA (US)

(73) Assignee: The United States of America as represented by the Secretary of the Navy, Washington, DC (US)

(21) Appl. No.: 09/531,404

(22) Filed: Mar. 20, 2000

(51) Int. Cl.[7] ..... F42B 12/18; F42B 12/00

(52) U.S. Cl. ..... 102/479; 102/479; 102/478; 102/201; 102/475; 102/308

(58) Field of Search ..... 102/475–476, 102/478–479, 491–492, 308, 201, 275.3, 275.8

(56) References Cited

U.S. PATENT DOCUMENTS

| | | | | | |
|---|---|---|---|---|---|
| 2,941,615 | A | * | 6/1960 | Holmes | 102/476 |
| 3,812,783 | A | * | 5/1974 | Yang et al. | 102/201 |
| 3,977,330 | A | * | 8/1976 | Held | 102/479 |
| 4,391,195 | A | * | 7/1983 | Shann | 102/201 |
| 4,662,281 | A | * | 5/1987 | Wilhelm et al. | 102/494 |
| 5,158,173 | A | * | 10/1992 | Halsey et al. | 206/3 |
| 5,229,542 | A | * | 7/1993 | Bryan et al. | 102/491 |
| H1214 | H | * | 8/1993 | Liva et al. | 102/201 |
| 5,698,814 | A | * | 12/1997 | Parsons et al. | 102/4 |
| 5,939,663 | A | * | 8/1999 | Walters et al. | 102/476 |

* cited by examiner

*Primary Examiner*—Michael J. Carone
*Assistant Examiner*—Lulit Semunegus
(74) *Attorney, Agent, or Firm*—Anthony J. Serventi

(57) ABSTRACT

This invention involves a hard target penetrating warhead designed to penetrate several layers of a target. A standard warhead casing is divided into several compartments with each compartment separated by a shock-absorbing shield. Explosive fill in contained within each compartment. The shock-absorbing shield inhibits the dynamic shock produced by detonating a compartment, thus preventing sympathetic detonation of adjoining compartments. Each compartment also contains a delay element, which permits each compartment to be ignited at the desired time. This allows the warhead to destroy a layer of a target then proceed to the next layer or layers, eliminating the need for several missiles to destroy the entire target.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SERIAL OUTPUT WARHEAD

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

This invention relates to warheads intended for destruction of targets using strategic precision. Specifically, this invention relates to missile warheads designed to control an explosive blast.

2. Description of the Related Technology

Missiles and warheads are used in a variety of demanding applications ranging from air to air and ground combat applications to structural demolition applications. Such applications often require missiles with warheads that can effectively and consistently penetrate and explode within hard targets with a great deal of accuracy.

A typical hard target missile includes an explosive warhead enclosed within a steel case.

A fuse serves to ignite the explosive warhead following target impact. When a warhead penetrates a target, the fuse detonates a booster charge or explosive lead, which in turn detonates the explosive fill in the warhead. The explosive fill may be comprised of many different chemical compositions, depending upon the desired effect of the warhead. Generally, the entire explosive fill is detonated and any other target that is not destroyed by the blast is left in tact. As a result, another missile must be sent to destroy any other remaining target.

Detonators contained within the housing of a warhead may be defined as a primary explosive or a secondary explosive. Primary explosives are generally contained within the fuse, while secondary explosives are located closer in proximity to the explosive fill and actually detonate the explosive fill. A primary explosive in the fuse initiates the detonator cord leading to a secondary explosive in the explosive fill. Examples of secondary explosives are boosters and explosive leads.

As warfare becomes more focused on isolating and destroying specific targets, while limiting the damage to any adjacent area, the need for weaponry arises that enables the military to eliminate targets with a great precision. Ideally, the military seeks to limit casualties in the civilian population, as well as, damage to non-military targets such as schools, hospitals and places of worship. To ensure this type of surgical precision, the location of the explosion must be controlled to some extent. Often, military targets are deeply embedded in bunkers or buildings. As a result, several missiles must be deployed and several layers must be destroyed before the target can be reached.

Hence, a need exists in the art for a safe and cost effective warhead, which possesses the capability to destroy several layers of armor or barriers, while limiting the possibility that undetonated explosive fill will undergo sympathetic detonation.

Sympathetic detonation is an explosive chain reaction that occurs when one device or round (often referred to as a "donor explosion") initiates a shock wave that results in the high-order detonation throughout adjacent explosives. Sympathetic detonation has been addressed in related technology. One method of mitigating the effect of the dynamic shock which causes sympathetic detonation uses ground or crushed compressible pumice as described in U.S. Pat. No. 5,158,173 issued Oct. 27, 1992 to Halsey, et al. and assigned to The United States of America as represented by the Secretary of the Navy. U.S. Pat. No. 5,158,173 discloses a material for absorbing the dynamic shock of an explosion to prevent sympathetic detonation of adjacent explosives. The material comprises a filler material for damping an explosive shock.

The filler means is collapsible and capable of absorbing an explosive shock and is also nonflammable in an aggressive thermal environment. A binding means allows the filler to cast into a self-supporting shape. A relatively compressible volcanic material, that is, a pumice is provided with a binder of a casting plaster.

SUMMARY OF THE INVENTION

The serial output warhead of the present invention addresses the need in the art. The current invention was devised to provide a warhead or missile that may perforate numerous barriers and engage several layers of a target.

In the invention, a standard warhead casing is divided into compartments, which contain explosive fill. A shock-absorbing shield is located between adjoining compartments to mitigate the dynamic shock of an explosion that may cause sympathetic detonation. A shielded detonation cord runs from the fuse well through each compartment. A delay element is placed in each compartment to ensure that each compartment is detonated at the desired time.

One object of the present invention is to create a warhead that engage and destroy numerous layers of a target with precision.

Another object of the invention is to create a warhead that can produce explosions with extreme accuracy, which allows a reduction of collateral damage to objects adjacent to the target.

A still further object of the invention is to prevent sympathetic detonation of adjacent explosive fill within the warhead.

The invention addresses the need for a missile, which perforate numerous barriers and void configurations and deliver lethal energy to each void as it travels through the target. This allows use of the missile against a broader range of targets.

DETAILED DESCRIPTION OF THE INVENTION

Figure 1:
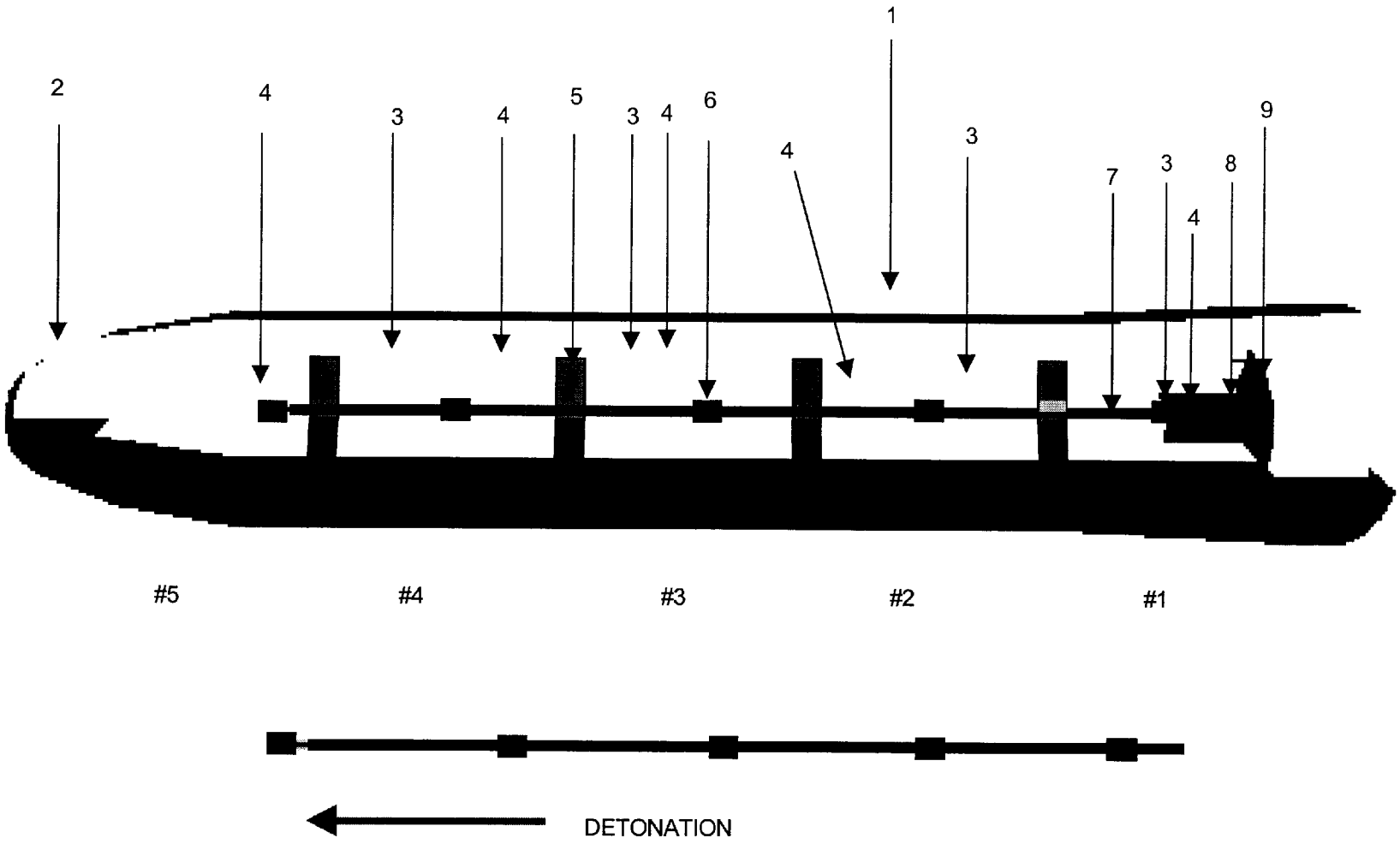
FIG. 1 is a cross-sectional diagram of a warhead in accordance with the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Referring more specifically to the drawings, for illustrative purposes the present invention is embodied in the apparatus as shown in FIG. 1. The warhead 1 includes a casing 2 divided into compartments 3 and a fuzewell 8 at one end. Explosive fill 4 is located within each compartment 3. A shock-absorbing shield 5 is located between each compartment 3. The compartment 3 farthest in proximity from the fazewell 8 acts as the terminal end of a shielded detonation cord 7, which originates at the fuzewell 8. A delay element 6 is located in each compartment 3 to control the time delay between detonations. The delay element 6 is a secondary explosive, which may be set to detonate the explosive fill 4 of each compartment 3 at different time intervals. A booster or explosive lead may act as a delay element 6.

The invention is initiated by the fuze 9 in the fuzewell 8. A single length of shielded detonator cord 7 is initiated by the fuze 9 in the fuzewell 8. The detonator cord 7 instantaneously initiates delay elements 6 embedded in each explosive fill compartment 3. A shock-absorbing shield 5 is used between each explosive fill compartment 3 to prevent sympathetic detonation of an adjoining compartment 3. Common examples of explosive fill are CH6 and PBXN-7. In the preferred embodiment, the shock absorbing shield 5 is constructed of ground or crushed compressible pumice as described in U.S. Pat. No. 5,158,173 issued Oct. 27, 1992 to Halsey, et al. and assigned to The United States of America as represented by the Secretary of the Navy. U.S. Pat. No. 5,158,173 is incorporated herein by reference.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A warhead which comprises:

a casing;

a plurality of compartments contained within said casing;

an explosive fill contained within each of said compartments;

means for absorbing dynamic shock positioned between adjacent compartments within said casing, wherein said means for absorbing dynamic shock is a pumice shield, said pumice shield being constructed of ground or crushed compressible pumice;

a delay element disposed within each of said plurality of compartments;

a fuzewell attached to said casing; and a shielded detonation cord, said shielded detonation cord having a first end and a second, said first end originating in said fuzewell and a second end terminating in a compartment farthest in proximity from said fuzewell, so that said shielded detonation cord runs through each of said plurality of compartments.

2. The warhead of claim 1, wherein said explosive fill is CH6 or PBXN-7.

3. The warhead of claim 1, wherein said delay element is a booster or an explosive lead.

4. A warhead which comprises:

a casing;

a plurality of compartments for containing explosives within said warhead;

a shock-absorbing shield positioned between adjacent compartments within said casing, so that unwanted sympathetic detonation is hindered, wherein said shock-absorbing shield is constructed of ground or crushed compressible pumice;

a delay element disposed within each of said plurality of compartments;

a fuse well means attached to said casing; and a shielded detonation cord, said shielded detonation cord having a first end and a second, said first end originating in said fuzewell and a second end terminating in a compartment farthest in proximity from said fuzewell, so that said shielded detonation cord runs through each of said plurality of compartments.

5. The warhead of claim 4, wherein said explosive fill is CH6 or PBXN-7.

6. The warhead of claim 4, wherein said delay element is a booster or an explosive lead.

* * * * *